Figure 1:
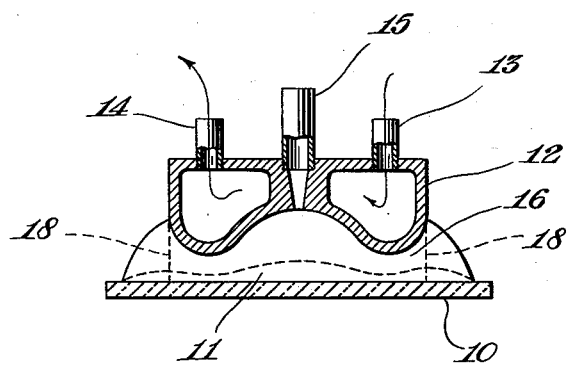

Nov. 21, 1950 — P. M. VAN ALPHEN — 2,530,742
PROCESS OF MANUFACTURING AN OPTICAL ELEMENT
Filed Jan. 14, 1946

PIETER MARTINUS VAN ALPHEN
INVENTOR.

BY
ATTORNEY

Patented Nov. 21, 1950

2,530,742

UNITED STATES PATENT OFFICE 2,530,742

PROCESS OF MANUFACTURING AN OPTICAL ELEMENT

Pieter Martinus van Alphen, Eindhoven, Netherlands, assignor, by mesne assignments, to Hartford National Bank and Trust Company, Hartford, Conn., as trustee Application January 14, 1946, Serial No. 641,179
In the Netherlands July 19, 1941

Section 1, Public Law 690, August 8, 1946
Patent expires July 19, 1961

6 Claims. (Cl. 18—58)

In the prior art as exemplified by U. S. Patent No. 2,332,930 to Herre Rinia for an "Optical Element," it is suggested by the patentee to make an optical element, as a lens, from a substance which is gelatinisable in solution. By proceeding in this manner it has been found possible to manufacture, for example, lenses with a very high accuracy in a comparatively simple manner without the use of grinding operations. In this case use is made of a mould into which a solution of a substance gelatinisable in solution is introduced. After this substance has been gelatinated from this solution (and dried up and hardened, if required), the element which has then acquired its desired shape may be removed from the mould.

According to this method use is made of the phenomenon that the gel which is separated in the mould from the solution of the gelatinisable substance and which exhibits rigidity, together with elasticity, contracts during drying up. The degree of contraction which occurs may be fully controlled by means of a suitable choice of the concentration of the gelatinisable substance present in the solution in the associated solvent. In the case of gelatine this contraction may be between factors of the order of magnitude of 3 and 50. Owing to this contraction, the matrix used for the manufacture of the optical element concerned may exhibit dimensions which are much larger than the dimensions of the object to be ultimately manufactured. The mould generally has a base plate to which adheres the solution introduced into the mould. Thus, the contraction which occurs is substantially limited to the axial dimensions of the optical element to be manufactured. The base plate of the mould just mentioned prevents contraction in the radial direction. As a result of this, the said process enables us to manufacture advantageously lenses of very small axial dimensions, more particularly also those lenses which exhibit one or more aspherical bounding surfaces. The grinding of this kind of lenses which are used as correcting elements, for example, in the Schmidt camera (Danjon et Coudert "Lunettes et Télescopes," 1935, p. 252-254) requires very much time and technical knowledge; with the aid of the above-described process these drawbacks are obviated. As already mentioned before, according to this process the optical element to be manufactured is hardened, if desired, which operation takes place during or after drying.

The present invention also relates to a process of manufacturing an optical element, as a lens, from the above-mentioned substances in which, however, the body in the gel state which has to constitute the lens is at first artificially hardened and only thereafter dried.

The method of hardening according to the present invention has the following advantages relatively to the method of hardening described in the aforesaid U. S. Patent No. 2,332,930.

As has been found by applicant, in the first place the limit of stretching strain of the hardened material lies considerably higher (approximately a factor 10) than that of the not hardened material. As has already been set out before, the body in the gel state which must constitute the optical element contracts during drying to a considerable extent and this involves rather high tensions in the material during drying, more particularly when the optical element to be manufactured exhibits large differences in thickness, as is the case, for example, when this element exhibits one or two aspherical bounding surfaces and thus dries up unequally. When the material is dried in the unhardened state, the tensions due to contraction may lead to tears or undesirable permanent deformations in the surface of the body which has to constitute the optical element. These render the element concerned less adapted for the purpose proper. Now, by proceeding in accordance with the invention and at first hardening and subsequently drying, the limit of stretched strain of the material during drying lies sufficiently high that the possibility of tears and undesirable permanent deformations is practically precluded.

Furthermore, due to the differences in thickness, such optical elements will never dry equally on the whole. For example, at a given moment the thinnest place of a lens to be manufactured is thoroughly dry, whereas on the thickest places the superficial parts are dry but the more inwardly located parts are not fully dry. This drawback becomes particularly manifest with optical elements in which the undried body in the gel state exhibits large differences in thickness, for example of the order of magnitude of at least 3 mms. In this case unequal drying occurs, which might lead to rings produced on the element due to drying. If, however, use is made of the process according to the invention, it is possible for the undried body which is hardened to be dried at a temperature higher than if the optical element is not hardened. Thus, the advantage is obtained that the occurrence of rings due to drying is substantially avoided due to the quicker drying. According to the invention, the hardening agent, for example formalin, may be added to the liquid from which the optical element concerned is to be manufactured. This is in general simpler than the arrangement of the undried optical element in an atmosphere of the hardening agent.

The substances from which the optical element according to the invention may be manufactured and which are consequently gelatinisable in solution may contain organic components, such as gelatine, agar-agar and pectine. It is also possible for these substances to contain inorganic components, such as silicates or aluminium oxides, with or without glycerine, to assist in the optical homogeneity of the optical element concerned. The solvent is chosen in accordance with the substance to obtain a solution which is gelatinisable. For gelatine use may be made, for example, of water as a solvent. The hardening of the body in the gel state which has to constitute the optical element may be effected, for example, with formalin.

It has been found by applicant that the method according to the invention is particularly adapted for the manufacture of an optical element in which at least one bounding surface in a section through the axis of the element exhibits a curve of a fourth or a higher degree.

The mould previously referred to may have, for example, a base plate of metal or glass. In the latter case it is conceivable that this base plate, after the manufacture of, for example, a lens, serves as a carrier for this lens.

Figure 2:
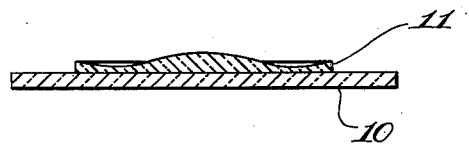

In the accompanying drawing:

Figure 1 is a cross-sectional view of apparatus which may be used in the process of constructing an optical element in accordance with the invention; and Fig. 2 is a cross-sectional view of an optical element produced by the invention.

Referring now to Fig. 1, a plate 10 of glass has positioned over it a template 12, constructed to be hollow. Template 12 is provided with two pipes 13 and 14 for the ingress and egress of a temperature controlling liquid; for example, water. The template 12 also has a central bore 15 which serves to supply material 16 from which the body 11 is to be made. The material 16 may consist, for example, of water in which gelatin is dissolved in a given concentration corresponding to the desired subsequent contraction and in addition, a sufficient amount of formalin to act as a hardening agent. By means of the water which flows through it, the template 12 is maintained at a temperature at which the gelatin just remains in the dissolved state. By gradually reducing the temperature of the template (and also of the glass plate if required), the solution 16 is gelatinized and a gel is produced which is possessed of resilience accompanied by rigidity. The template 12 can then be removed and the material 16 remains on the plate 10. As the material 16 already contains the formalin, it may be heated to cause drying with comparative rapidity and it is unnecessary after the substance is completely dried to harden it in a formalin atmosphere. As the substance 16 shrinks and dries, it assumes the shape of the element 11 shown by dotted lines and at the same time, the substance adheres to the plate 10 so that no contraction occurs radially. The edge of the gelled material may be severed circumferentially along the lines 18.

Thus is obtained the optical element 11 adhering to the plate 10 as shown in Fig. 2.

What I claim is:

1. A method of manufacturing an optical element from a material which is gelatinizable in solution, comprising the steps of placing a quantity of the material in solution upon the surface of a support to which the gelled material adheres, forming the said material in solution into a gelled mass having predetermined thickness and length dimensions, artificially hardening said mass by the action of a hardening agent, and thereafter desiccating the so hardened mass to reduce its shape to that of the optical element.

2. A method of manufacturing an optical element from a material which is gelatinizable in solution, comprising the steps of shaping a quantity of the material into a mass having a form approximating that of the optical element, hardening the so-formed mass by the action of a hardening agent, and drying the so-formed and so-hardened mass to reduce its size and change its shape to that of the optical element.

3. A method of manufacturing an optical element from a material which is gelatinizable in solution, comprising the steps of placing a quantity of the material in solution upon the surface of a support to which the gelled material adheres, forming the said material in solution into a gelled mass having predetermined thickness and length dimensions, artificially hardening said mass by the action of a hardening agent, and thereafter heating the so-hardened mass to desiccate the same with substantial uniformity.

4. A method of manufacturing an optical element from a material which is gelatinizable in solution, comprising the steps of adding a hardening agent to a quantity of the material in solution, placing a quantity of the so-formed material upon the surface of a support to which the gelled mass adheres, forming the said material into a gelled mass having thicknesses and thickness variations substantially proportional and greater than those of the element to be formed, said gelled mass having length dimensions substantially the same as those of the element to be formed, the said thickness variations being greater than about 3 mms., allowing the mass to become hardened by the action of the hardening agent, and thereafter desiccating the so-hardened mass while on the support, whereby the thicknesses and thickness variations of said mass are reduced to the element to be formed and the said length dimensions are maintained substantially constant.

5. A method of manufacturing an optical element from a material which is gelatinizable in solution, comprising the steps of placing upon the surface of a support to which the gelled mass adheres a quantity of the material in a solution in which is incorporated a hardening agent, forming the said material in solution into a gelled mass, allowing the gelled mass to become hardened by the action of the hardening agent, and desiccating the so-hardened mass while on the support.

6. A method of manufacturing an optical element from a material which is gelatinizable in solution, comprising the steps of placing upon the surface of a support to which the gelled material adheres a quantity of material in a solution to which has been added a hardening agent, forming the said material in said solution into a gelled mass, hardening the so-formed gelled mass by the action of the hardening agent, and subsequently heating the so-hardened mass to desiccate the same with substantial uniformity.

PIETER MARTINUS VAN ALPHEN.

REFERENCES CITED

The following references are of record in the file of this patent:

UNITED STATES PATENTS

| Number | Name | Date |
|---|---|---|
| 869,311 | Leuchter | Oct. 29, 1907 |
| 2,170,979 | Straubel | Aug. 29, 1939 |
| 2,332,930 | Rinia | Oct. 26, 1943 |
| 2,377,268 | Rinia | May 29, 1945 |

FOREIGN PATENTS

| Number | Country | Date |
|---|---|---|
| 870,188 | France | Dec. 5, 1941 |